US012415970B2

(12) United States Patent
Debreczeni et al.

(10) Patent No.: US 12,415,970 B2
(45) Date of Patent: Sep. 16, 2025

(54) LIQUID HAND DISHWASHING DETERGENT COMPOSITION

(71) Applicant: The Procter & Gamble Company, Cincinnati, OH (US)

(72) Inventors: Mate Debreczeni, Brussels (BE); Rebecca Ann Langevin, Norwood, OH (US); Randall Thomas Reilman, Cincinnati, OH (US); Phillip Kyle Vinson, Fairfield, OH (US); John August Wos, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 396 days.

(21) Appl. No.: 18/077,559

(22) Filed: Dec. 8, 2022

(65) Prior Publication Data

US 2023/0174897 A1 Jun. 8, 2023

(30) Foreign Application Priority Data

Dec. 8, 2021 (EP) .................................... 21213018

(51) Int. Cl.

| | |
|---|---|
| ***C11D 1/12*** | (2006.01) |
| ***C11D 1/14*** | (2006.01) |
| ***C11D 1/22*** | (2006.01) |
| ***C11D 1/26*** | (2006.01) |
| ***C11D 1/37*** | (2006.01) |
| ***C11D 1/66*** | (2006.01) |
| ***C11D 1/83*** | (2006.01) |
| ***C11D 1/88*** | (2006.01) |
| ***C11D 1/94*** | (2006.01) |
| ***C11D 17/08*** | (2006.01) |

(52) U.S. Cl.
CPC ................ *C11D 1/94* (2013.01); *C11D 17/08* (2013.01)

(58) Field of Classification Search
CPC .... C11D 1/12; C11D 1/14; C11D 1/22; C11D 1/26; C11D 1/37; C11D 1/66; C11D 1/83; C11D 1/88; C11D 1/94
See application file for complete search history.

(56) References Cited

U.S. PATENT DOCUMENTS

| | | | |
|---|---|---|---|
| 3,909,460 | A | 9/1975 | Mccoy |
| 3,948,953 | A | 4/1976 | Mccoy |

(Continued)

FOREIGN PATENT DOCUMENTS

| | | | | |
|---|---|---|---|---|
| JP | S5829899 A | | 2/1983 | |
| PL | 175563 | * | 1/1999 | ........... C07D 319/06 |

(Continued)

OTHER PUBLICATIONS

Extended EP Search Report and Written Opinion for 21213018.1 dated May 30, 2022, 06 pages.

*Primary Examiner* — Brian P Mruk
(74) *Attorney, Agent, or Firm* — Carolyn S. Powell; Elizabeth A. Conklin

(57) ABSTRACT

A hand dishwashing detergent composition includes from 5.0% to 50% of a surfactant system by weight of the liquid hand dishwashing detergent composition. The surfactant system includes an anionic surfactant. The anionic surfactant includes an alkyl sulfate anionic surfactant and glyceryl acetal sulfate surfactant. The glyceryl acetal sulfate surfactant is selected from glyceryl acetal sulfate having the formula I or formula II or salts thereof, and mixtures thereof.

20 Claims, 1 Drawing Sheet

(56) References Cited

U.S. PATENT DOCUMENTS

| | | | | |
|---|---|---|---|---|
| 4,554,098 | A | 11/1985 | Klisch et al. | |
| 2020/0199489 | A1 | 6/2020 | Kropf et al. | |
| 2023/0174895 | A1 * | 6/2023 | Langevin | C11D 1/83 549/511 |

FOREIGN PATENT DOCUMENTS

| | | | | | |
|---|---|---|---|---|---|
| PL | 175563 | B1 | * | 1/1999 | C07D 319/06 |
| PL | 177120 | | * | 9/1999 | C07D 319/06 |
| PL | 177120 | B1 | * | 9/1999 | C07D 319/06 |
| WO | 9206156 | A1 | | 4/1992 | |
| WO | 9206161 | A1 | | 4/1992 | |

* cited by examiner

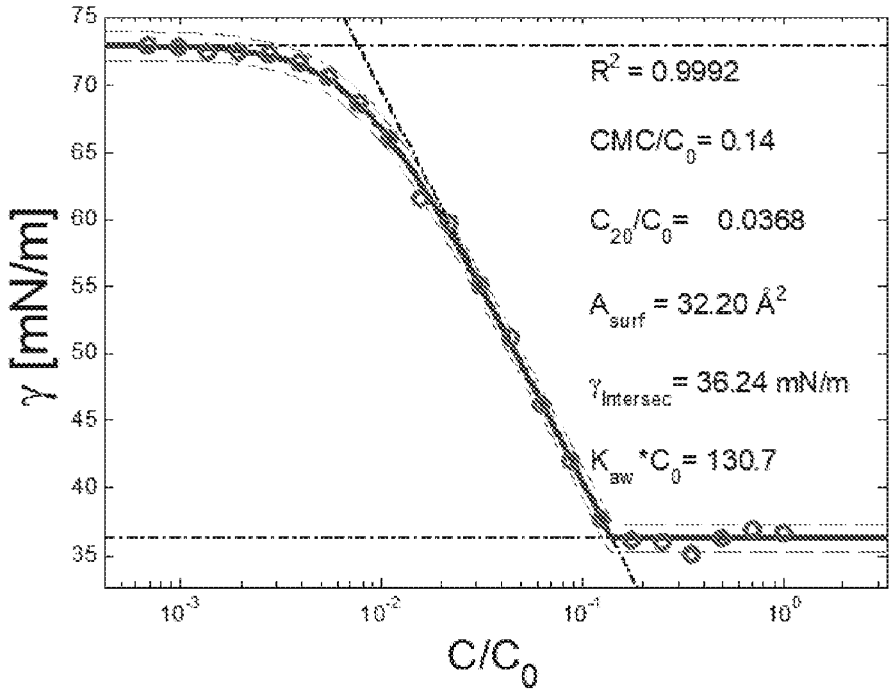
γ [mN/m]
75
70
65
60
55
50
45
40
35
10^-3
10^-2
10^-1
10^0
C/C0
R^2 = 0.9992
CMC/C0= 0.14
C20/C0= 0.0368
Asurf = 32.20 Å^2
γIntersec= 36.24 mN/m
Kaw *C0= 130.7

LIQUID HAND DISHWASHING DETERGENT COMPOSITION

TECHNICAL FIELD

This disclosure relates to liquid hand dishwashing detergent compositions, which provide good sudsing, cleaning and low temperature stability profile, while still having high biodegradability and a high level of renewable components.

BACKGROUND

During manual dishwashing in a sink full of water into which a detergent composition has been diluted to form a cleaning liquor, the user typically relies on the level of suds to indicate the remaining cleaning efficacy of the diluted detergent composition. A high suds volume and/or stable, long-lasting suds longevity (i.e., mileage) indicates to the user that sufficient active ingredients (e.g., surfactants) remain, in order to perform the desired cleaning. Poor suds longevity typically leads to the user dosing additional detergent composition even when cleaning efficacy remains.

SUMMARY

Anionic surfactants have been used, typically in combination with cosurfactants, especially amphoteric and zwitterionic co-surfactants such as amine oxide and betaines, to provide suds during dishwashing, with alkyl sulfate and alkyl alkoxy sulfates, especially alkyl ethoxy sulfates, being found to be particularly effective at providing improved sudsing in addition to the desired cleaning.

These surfactants typically comprise at least a partial fraction derived from petrochemical sources. However, there is an increasing desire for detergent compositions which have improved biodegradability, and which are derived from renewable sources.

Non-alkoxylated alkyl sulfate surfactants can be formed using naturally derived alkyl chains, such as those derived from palm kernel oil or coconut oil. It has also been found that non-alkoxylated alkyl sulfate surfactants are readily biodegradable by microorganisms in soil and natural waters. However, such naturally derived alkyl chains are typically fully linear, resulting in fully linear non-alkoxylated alkyl sulfate surfactants. Liquid detergent compositions comprising linear alkyl sulfates typically require more solvent to provide the desired low temperature phase stability and to achieve the desired viscosity profile for ease of dosing by the user. The increased solvent also results in a less environmentally sustainable composition, such solvents typically also being derived from petrochemical sources. In addition, non-alkoxylated alkyl sulfate surfactants are also typically less sudsing than ethoxylated alkyl sulfate surfactants, especially when in presence with greasy soils, and more prone to precipitate from solution in hard water.

As such, there is a need for a liquid hand dishwashing detergent composition comprising a higher fraction of components derived from natural, renewable sources, ideally also having improved biodegradability, while still providing good sudsing, grease removal, and low temperature stability.

The present disclosure relates to a liquid hand dishwashing detergent composition comprising from 5.0% to 50% by weight of the liquid hand dishwashing detergent composition of a surfactant system, wherein the surfactant system comprises: anionic surfactant, wherein the anionic surfactant comprises: alkyl sulfate anionic surfactant, and glyceryl acetal sulfate surfactant, wherein the glyceryl acetal sulfate surfactant is selected from glyceryl acetal sulfate having the formula I or formula II or salts thereof, and mixtures thereof:

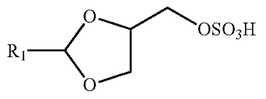

(I)

wherein R1 is an alkyl chain comprising from 7 to 18 carbon atoms;

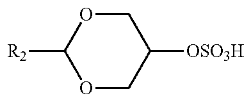

(II)

wherein R2 is an alkyl chain comprising from 7 to 18 carbon atoms.

BRIEF DESCRIPTION OF THE DRAWING

FIG. 1 is a plot of the surface tension of a sodium dodecyl glyceryl acetal sulfate surfactant as a function of the normalised surfactant concentration at the desired water temperature (20.5 C) and hardness of about 120 mg/L made using calcium chloride and magnesium chloride at a 3:1 molar ratio of calcium:magnesium and is used in order to calculate the critical micelle concentration (CMC) of the surfactant. The point where the surface tension versus surfactant concentration slope changes is defined as the CMC value. C0 is 2250 mg/L of sodium dodecyl glyceryl acetal sulfate surfactant in water with the corresponding CMC of this replicate being 315.9 mg/L.

DETAILED DESCRIPTION

Formulating the liquid cleaning composition with a surfactant system which comprises alkyl sulfate anionic surfactant and glyceryl acetal sulfate surfactant, as described herein, results in a hand dishwashing detergent composition comprising a higher fraction of components derived from natural, renewable sources, having improved biodegradability, while still providing good sudsing, grease removal, and low temperature stability.

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present disclosure can comprise, consist of, and consist essentially of the essential elements and limitations of the composition described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease in the material) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes initial suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high initial suds volume and/or sustained suds volume, particularly during a substantial portion of or for the entire manual dishwashing process. This is important as the consumer uses high suds as an indicator that enough cleaning composition has been dosed. Moreover, the consumer also uses the sustained suds volume as an indicator that enough active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of the compositions as described and claimed herein.

All percentages are by weight of the total composition, as evident by the context, unless specifically stated otherwise. All ratios are weight ratios, unless specifically stated otherwise, and all measurements are made at 25° C., unless otherwise designated.

Liquid Cleaning Composition

The cleaning composition is a liquid cleaning composition, preferably a liquid hand dishwashing cleaning composition, and hence is in liquid form. The liquid cleaning composition is preferably an aqueous cleaning composition. As such, the composition can comprise from 50% to 85%, preferably from 50% to 75%, by weight of the total composition of water.

The liquid cleaning composition has a pH greater than 6.0, or a pH of from 6.0 to 12.0, preferably from 7.0 to 11.0, more preferably from 8.0 to 10.0, measured as a 10% aqueous solution in demineralized water at 20 degrees ° C.

The liquid cleaning composition of the present disclosure can be Newtonian or non-Newtonian, preferably Newtonian. Preferably, the composition has a viscosity of from 10 mPa-s to 10,000 mPa-s, preferably from 100 mPa-s to 5,000 mPa-s, more preferably from 300 mPa-s to 2,000 mPa-s, or most preferably from 500 mPa-s to 1,500 mPa-s, alternatively combinations thereof.

The compositions of the present disclosure may comprise renewable components and exhibit good performance, such as cleaning and suds mileage. The compositions disclosed herein may comprise from 20% or from 40% or from 50%, to 60% or 80% or even to 100% by weight of renewable components. The compositions disclosed herein may be at least partially or fully bio-based, As such, the composition can comprise a bio-based carbon content of from 50% to 100%, preferably from 75% to 100%, most preferably from 80% to 100%, most preferably about 90% to about 100%. By bio-based, it is meant that the material is derived from substances derived from living organisms such as farmed plants, rather than, for example, coal-derived or petroleum-derived. The percent bio-based carbon content can be calculated as the "percent Modern Carbon (pMC)" as derived using the methodology of ASTM D6866-16. The compositions of the present disclosure may be substantially free of petroleum-derived solvents. The compositions of the present disclosure may be substantially free of surfactants or even polymers derived from petroleum-derived alcohols.

Surfactant System

The liquid cleaning composition comprises from 5.0% to 50%, preferably from 6.0% to 40%, most preferably from 15% to 35%, by weight of the total composition of a surfactant system.

Anionic Surfactant

The surfactant system comprises anionic surfactant. The anionic surfactant comprises alkyl sulfate anionic surfactant, and glyceryl acetal sulfate surfactant. The alkyl sulfate anionic surfactant and the glyceryl acetal sulfate surfactant can be present at a weight ratio of from 10:1 to 1:2, preferably from 7:1 to 1:1, and most preferably from 5:1 to 2:1. Without wishing to be bound by theory, it is believed that a mixture provides a surfactant packing which balances performance, low temperature stability and robustness against water hardness variations.

The surfactant system can comprise at least 40%, preferably from 60% to 90%, more preferably from 65% to 85% by weight of the surfactant system of the anionic surfactant. The surfactant system is preferably free of fatty acid or salt thereof, since such fatty acids impede the generation of suds.

The anionic surfactant can comprise at least 70%, preferably at least 85%, more preferably 100% by weight of the anionic surfactant of alkyl sulfate anionic surfactant and glyceryl acetal sulfate surfactant.

Alkyl Sulfate Anionic Surfactant

The anionic surfactant can comprise at least 25%, preferably from 30% to 90%, more preferably from 65% to 85% by weight of the anionic surfactant of alkyl sulfated anionic surfactant.

The mol average alkyl chain length of the alkyl sulfate anionic surfactant can be from 8 to 18, preferably from 10 to 14, more preferably from 12 to 14, most preferably from 12 to 13 carbon atoms, in order to provide a combination of improved grease removal and enhanced speed of cleaning.

The alkyl chain of the alkyl sulfate anionic surfactant can have a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 57/43, preferably from 60/40 to 90/10, more preferably from 60/40 to 80/20, most preferably from 60/40 to 70/30, while not compromising suds mileage in the presence of particulate soils.

The relative molar amounts of C13 and C12 alkyl chains in the alkyl sulfate anionic surfactant can be derived from the carbon chain length distribution of the anionic surfactant. The carbon chain length distribution of the alkyl chains of the alkyl sulfate anionic surfactants can be obtained from the technical data sheets from the suppliers for the surfactant or constituent alkyl alcohol. Alternatively, the chain length distribution and average molecular weight of the fatty alcohols, used to make the alkyl sulfate anionic surfactant, can also be determined by methods known in the art. Such methods include capillary gas chromatography with flame ionisation detection on medium polar capillary column, using hexane as the solvent. The chain length distribution is based on the starting alcohol and alkoxylated alcohol. As such, the alkyl sulfate anionic surfactant should be hydrolysed back to the corresponding alkyl alcohol and alkyl alkoxylated alcohol before analysis, for instance using hydrochloric acid.

The alkyl sulfate anionic surfactant can have an average degree of branching of less than 15%, preferably less than 10%, more preferably the alkyl sulfate anionic surfactant is linear. Alternatively, the alkyl sulfate anionic surfactant can have a weight average degree of branching of at least 15%, preferably from 20% to 60%, more preferably from 30% to 50%. These highly branched materials are typically originating from petrochemical sources.

The alkyl sulfate anionic surfactant can comprise at least 5%, preferably at least 10%, most preferably at least 25%, by weight of the alkyl sulfate anionic surfactant, of branching on the C2 position (as measured counting carbon atoms from the sulfate group for non-alkoxylated alkyl sulfate anionic surfactants, and the counting from the alkoxy-group furthest from the sulfate group for alkoxylated alkyl sulfate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulfate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the liquid cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic alkyl sulfate surfactant mixture can be calculated using the following formula:

$$\text{Weight average degree of branching (\%) } [(x1 * \text{wt \% branched alcohol 1 in alcohol } 1 + x2 * \text{wt \% branched alcohol 2 in alcohol } 2 + \ldots)/(x1 + x2 + \ldots)] * 100$$

wherein x1, x2, . . . are the weight in grams of each alcohol in the total alcohol mixture of the alcohols which were used as starting material before (alkoxylation and) sulfation to produce the alkyl (alkoxy) sulfate anionic surfactant. In the weight average degree of branching calculation, the weight of the alkyl alcohol used to form the alkyl sulfate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulfate anionic surfactant.

The alkyl sulfate surfactant can be alkoxylated or free of alkoxylation.

When alkoxylated, the alkyl sulfate anionic surfactant can have an average degree of alkoxylation of less than 3.5, preferably from 0.3 to 2.0, more preferably from 0.5 to 0.9, in order to improve low temperature physical stability and improve suds mileage of the compositions of the present disclosure. When alkoxylated, ethoxylation is preferred.

However, the alkyl sulfate anionic surfactant preferably has an average degree of alkoxylation of less than 0.25, more preferably less than 0.1, and most preferably, the alkyl sulfate anionic surfactant is free of alkoxylation. As such, the alkyl sulfate surfactant comprises less than 10% preferably less than 5% by weight of the alkyl sulfate anionic surfactant of an alkoxylated alkyl sulfate surfactant, more preferably wherein the alkyl sulfate anionic surfactant is free of an alkoxylated alkyl sulfate surfactant.

The average degree of alkoxylation is the mol average degree of alkoxylation (i.e., mol average alkoxylation degree) of all the alkyl sulfate anionic surfactant. Hence, when calculating the mol average alkoxylation degree, the mols of non-alkoxylated sulfate anionic surfactant are included:

$$\text{Mol average alkoxylation degree} = (x1 * \text{alkoxylation degree of surfactant } 1 + x2 * \text{alkoxylation degree of surfactant } 2 + \ldots)/(x1 + x2 + \ldots)$$

wherein x1, x2, . . . are the number of moles of each alkyl (or alkoxy) sulfate anionic surfactant of the mixture and alkoxylation degree is the number of alkoxy groups in each alkyl sulfate anionic surfactant.

Preferred alkyl alkoxy sulfates are alkyl ethoxy sulfates

Suitable counterions include alkali metal cation earth alkali metal cation, alkanolammonium or ammonium or substituted ammonium, but preferably sodium.

Suitable examples of commercially available alkyl sulfate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

The performance can be affected by the width of the alkoxylation distribution of the alkoxylated alkyl sulfate anionic surfactant, including grease cleaning, sudsing, low temperature stability and viscosity of the finished product. The alkoxylation distribution, including its broadness can be varied through the selection of catalyst and process conditions when making the alkoxylated alkyl sulfate anionic surfactant.

If ethoxylated alkyl sulfate is present, without wishing to be bound by theory, through tight control of processing conditions and feedstock material compositions, both during alkoxylation especially ethoxylation and sulfation steps, the amount of 1,4-dioxane by-product within alkoxylated especially ethoxylated alkyl sulfates can be reduced. Based on recent advances in technology, a further reduction of 1,4-dioxane by-product can be achieved by subsequent stripping, distillation, reverse osmosis, nanofiltration, evaporation, centrifugation, microwave irradiation, molecular sieving or catalytic or enzymatic degradation steps. Processes to control 1,4-dioxane content within alkoxylated/ethoxylated alkyl sulfates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

Glyceryl Acetal Sulfate

The anionic surfactant comprises glyceryl acetal sulfate surfactant. The anionic surfactant can comprise at least 70%, preferably at least 85%, more preferably 100% by weight of the anionic surfactant of alkyl sulfate anionic surfactant and glyceryl acetal sulfate surfactant The glyceryl acetal sulfate surfactant is selected from glyceryl acetal sulfate having the formula I or formula II or salts thereof, and mixtures thereof:

(I)

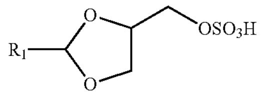

wherein R1 is an alkyl chain comprising from 7 to 18 carbon atoms, preferably from 10 to 16 carbon atoms, more preferably from 12 to 14 carbon atoms;

(II)

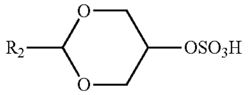

wherein R2 is an alkyl chain comprising from 7 to 18 carbon atoms, preferably from 10 to 16 carbon atoms, more preferably from 12 to 14 carbon atoms.

The alkyl glyceryl acetal sulfate anionic surfactant can have a weight average degree of branching of less than 30%, preferably less than 20%, more preferably less than 10%, and most preferably the alkyl chain of the alkyl glyceryl acetal sulfate anionic surfactant is linear. Most preferably R1 and R2 are derived from natural renewable sources including coconut or palm kernel sources.

The alkyl glyceryl acetal sulfate anionic surfactant and alkyl sulfate surfactant can both have a weight average degree of branching of less than 30%, preferably less than 20%, more preferably less than 10%, with linear chains being preferred for both.

The surfactants can be derived from glycerol (propane-1,2,3-triol), which is a hydrolysis product of fat saponification. Such alkyl glyceryl acetal sulfate anionic surfactants can be produced as described in Piasecki, A., et al; "Synthesis and Surface Properties of Chemodegradable Anionic Surfactants: Diastereomeric (2-n-alkyl-1,3-dioxan-5-yl) sulfates with Monovalent Counter Ions", *J. Surfactants and Detergents,* 2000, vol 3(1), pp 59-65 or in PL 175563B1, Example 1. As such, the glycerol is combined with an alkyl aldehyde to form the alkyl glyceryl acetal, which is then sulfated to form the alkyl glyceryl acetal sulfate. The alkyl aldehyde can be derived from an alkyl alcohol or via the reduction of an alkyl ester or alkyl acid, such as carboxylic acid.

The weight average degree of branching for an anionic alkyl glyceryl acetal sulfate surfactant mixture of Formula I, formula II, or a mixture of Formula I and II can be calculated using the following formula:

$$\text{Weight average degree of branching (\%)}=[(x1\text{*wt \% branched aldehyde 1 in aldehyde 1}+x2\text{*wt \% branched aldehyde 2 in aldehyde 2}+\ldots)/(x1+x2+\ldots)]\text{*}100$$

wherein x1, x2, . . . are the weight in grams of each aldehyde in the total mixture of the aldehyde which were used as starting material before conversion into alkyl glyceryl acetals and subsequent sulfation to produce the alkyl glyceryl acetal sulfate anionic surfactant. In the weight average degree of branching calculation, the weight of each aldehyde (branched and unbranched) used to form the alkyl glyceryl acetal sulfate anionic surfactant is used.

The alkyl glyceryl acetal can be sulfated using sulfur trioxide (SO3) amine complexes or its derivatives. Suitable derivatives of Sulfur trioxide include sulfur trioxide complexes such as chlorosulfonic acid, sulfuric acid, or sulfamic acid with amines. Sulfur trioxide-pyridine complex is preferred since it tends to result in more pure products. The sulfation reaction may take place in a continuous process using a cascade, falling film or tube bundle reactor, with the sulfur trioxide and amine being applied in an equimolar or small excess, usually in a temperature range of 20° C. to 60° C., with the reaction temperature being determined at least partially by the solidification point of the fatty alcohol in the reaction. The reaction typically results in the acid form of the alkyl sulfate anionic surfactant which is typically neutralised in a subsequent step, using an alkali such as sodium hydroxide, potassium hydroxide, magnesium hydroxide lithium hydroxide, calcium hydroxide, ammonium hydroxide, monoethanolamine, diethanolamine, triethanolamine, monoisopropanolamine, diamines, polyamines, primary amines, secondary amines, tertiary amines, amine containing surfactants, and mixtures thereof, with the sodium salt being preferred.

The alkyl glyceryl acetal sulfate surfactant can be selected from the group consisting of: 2-dodecyl-1,3-dioxan-5-yl hydrogen sulfate; (2-dodecyl-1,3-dioxolan-4-yl)methyl hydrogen sulfate; 2-(dodecan-2-yl)-1,3-dioxan-5-yl hydrogen sulfate; (2-(dodecan-2-yl)-1,3-dioxolan-4-yl)methyl hydrogen sulfate; (2-decyl-1,3-dioxolan-4-yl)methyl hydrogen sulfate; (2-(heptan-3-yl)-1,3-dioxolan-4-yl)methyl hydrogen sulfate; (2-(nonan-4-yl)-1,3-dioxolan-4-yl)methyl hydrogen sulfate; (2-dodecan-3-yl)-1,3-dioxolan-4-yl) methyl hydrogen sulfate; (2-(dodecan-4-yl)-1,3-dioxolan-4-yl)methyl hydrogen sulfate; (2-(dodecan-5-yl)-1,3-dioxolan-4-yl)methyl hydrogen sulfate; (2-(dodecan-6-yl)-1,3-dioxolan-4-yl)methyl hydrogen sulfate; 2-decyl-1,3-dioxan-5-yl hydrogen sulfate; 2-(heptan-3-yl)-1,3-dioxan-5-yl hydrogen sulfate; 2-(nonan-4-yl)-1,3-dioxan-5-yl hydrogen sulfate; 2-(dodecan-3-yl)-1,3-dioxan-5-yl hydrogen sulfate; 2-(dodecan-4-yl)-1,3-dioxan-5-yl hydrogen sulfate; 2-(dodecan-5-yl)-1,3-dioxan-5-yl hydrogen sulfate; 2-(dodecan-6-yl)-1,3-dioxan-5-yl hydrogen sulfate; (2-nonyl-1,3-dioxolan-4-yl)methanesulfonic acid; 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate); 1,3-Dioxan-5-ol, 2-nonyl-, 5-(hydrogen sulfate), trans; 1,3-Dioxan-5-ol, 2-heptyl-, 5-(hydrogen sulfate), cis; 1,3-Dioxan-5-ol, 2-heptyl-, 5-(hydrogen sulfate), trans; 1,3-Dioxan-5-ol, 2-nonyl-, 5-(hydrogen sulfate), cis; 1,3-Dioxan-5-ol, 2-nonyl-, 5-(hydrogen sulfate); 1,3-Dioxolan-4-ol, 2-dodecyl-, 4-(hydrogen sulfate), and mixtures thereof.

The alkyl glyceryl acetal sulfate surfactant is preferably selected from the group consisting of: 2-dodecyl-1,3-dioxan-5-yl hydrogen sulfate; (2-dodecyl-1,3-dioxolan-4-yl) methyl hydrogen sulfate; 2-(dodecan-2-yl)-1,3-dioxan-5-yl hydrogen sulfate; (2-(dodecan-2-yl)-1,3-dioxolan-4-yl) methyl hydrogen sulfate; (2-decyl-1,3-dioxolan-4-yl)methyl hydrogen sulfate; 2-decyl-1,3-dioxan-5-yl hydrogen sulfate; 1,3-Dioxolan-4-ol, 2-dodecyl-, 4-(hydrogen sulfate); 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate), and mixtures thereof.

The alkyl glyceryl acetal sulfate surfactant is most preferably selected from the group consisting of: 2-dodecyl-1,3-dioxan-5-yl hydrogen sulfate; (2-dodecyl-1,3-dioxolan-4-yl)methyl hydrogen sulfate; 2-(dodecan-2-yl)-1,3-dioxan-5-yl hydrogen sulfate; (2-(dodecan-2-yl)-1,3-dioxolan-4-yl) methyl hydrogen sulfate; 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate), and mixtures thereof.

Suitable alkyl glyceryl acetal sulfate surfactant include stereoisomers of the structures and chemical names described herein.

The structures of suitable alkyl glyceryl acetal sulfate surfactants is given below:

| Name | Structure |
| --- | --- |
| 2-dodecyl-1,3-dioxan-5-yl hydrogen sulfate | 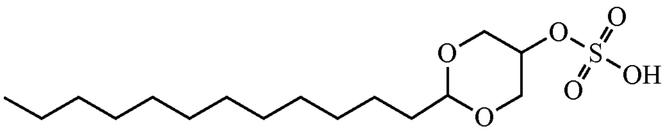 [SMILES: CCCCCCCCCCCCC1OCC(OS(=O)(=O)O)CO1] |
| (2-dodecyl-1,3-dioxolan-4-yl)methyl hydrogen sulfate | 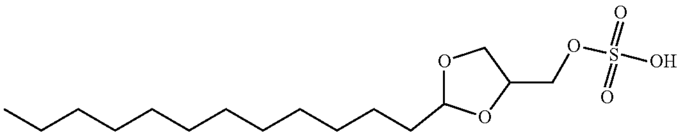 [SMILES: CCCCCCCCCCCCC1OCC(COS(=O)(=O)O)O1] |
| 2-(dodecan-2-yl)-1,3-dioxan-5-yl hydrogen sulfate | 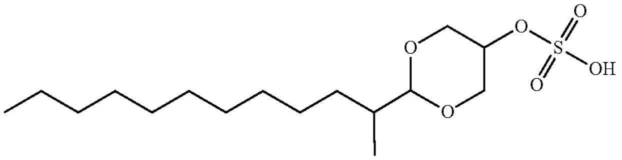 [SMILES: CCCCCCCCCCC(C)C1OCC(OS(=O)(=O)O)CO1] |
| (2-(dodecan-2-yl)-1,3-dioxolan-4-yl)methyl hydrogen sulfate | 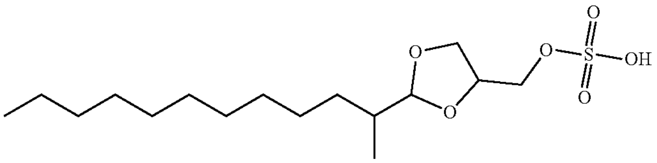 [SMILES: CCCCCCCCCCC(C)C1OCC(COS(=O)(=O)O)O1] |
| (2-decyl-1,3-dioxolan-4-yl)methyl hydrogen sulfate | 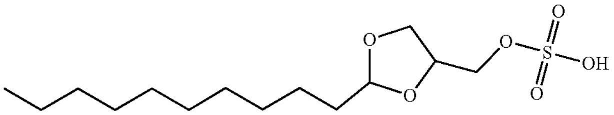 [SMILES: CCCCCCCCCCC1OCC(COS(=O)(=O)O)O1] |
| (2-(heptan-3-yl)-1,3-dioxolan-4-yl)methyl hydrogen sulfate | 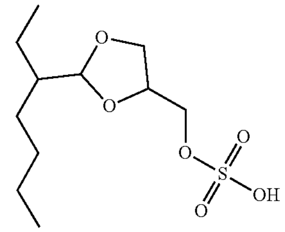 [SMILES: CCCCC(CC)C1OCC(COS(=O)(=O)O)O1] |
| (2-(nonan-4-yl)-1,3-dioxolan-4-yl)methyl hydrogen sulfate | 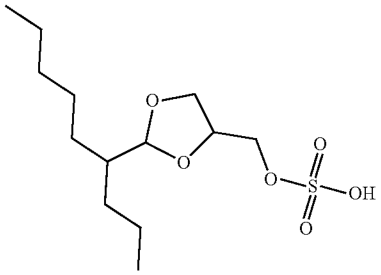 [SMILES: CCCCCC(CCC)C1OCC(COS(=O)(=O)O)O1] |
| (2-dodecan-3-yl)-1,3-dioxolan-4-yl)methyl hydrogen sulfate | 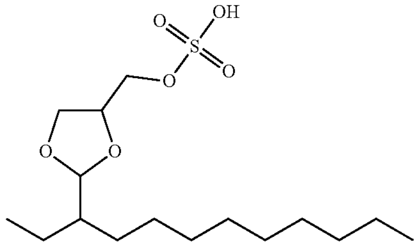 [SMILES: CCCCCCCCCC(CC)C1OCC(COS(=O)(=O)O)O1] |

-continued
| Name | Structure |
|---|---|
| (2-(dodecan-4-yl)-1,3-dioxolan-4-yl)methyl hydrogen sulfate | 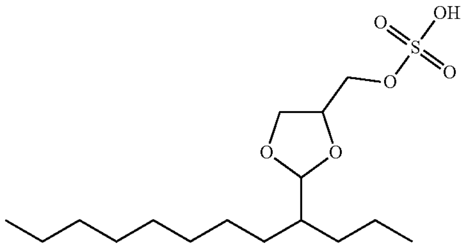 [SMILES: CCCCCCCCC(CCC)C1OCC(COS(=O)(=O)O)O1] |
| (2-(dodecan-5-yl)-1,3-dioxolan-4-yl)methyl hydrogen sulfate | 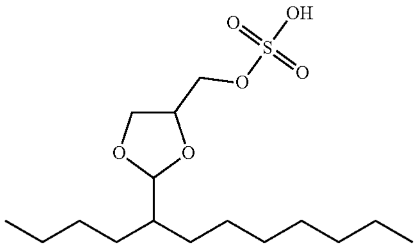 [SMILES: CCCCCCCC(CCCC)C1OCC(COS(=O)(=O)O)O1] |
| (2-(dodecan-6-yl)-1,3-dioxolan-4-yl)methyl hydrogen sulfate | 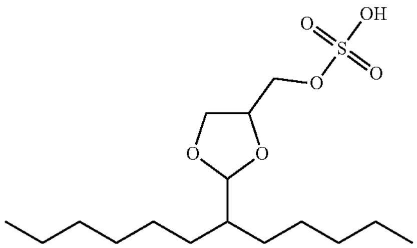 [SMILES: CCCCCCC(CCCCC)C1OCC(COS(=O)(=O)O)O1] |
| 2-decyl-1,3-dioxan-5-yl hydrogen sulfate | 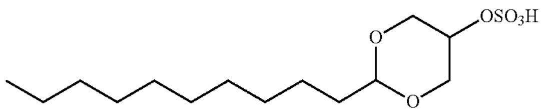 |
| 2-(heptan-3-yl)-1,3-dioxan-5-yl hydrogen sulfate | 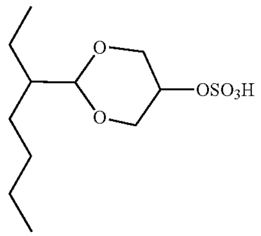 |
| 2-(nonan-4-yl)-1,3-dioxan-5-yl hydrogen sulfate | 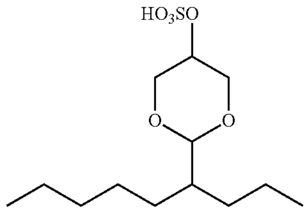 |
| 2-(dodecan-3-yl)-1,3-dioxan-5-yl hydrogen sulfate | 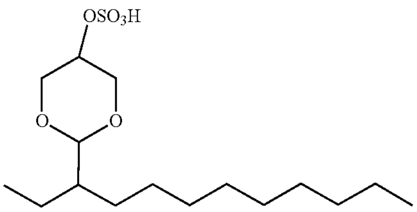 |

-continued

| Name | Structure |
| --- | --- |
| 2-(dodecan-4-yl)-1,3-dioxan-5-yl hydrogen sulfate | 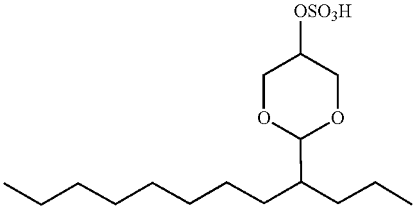 |
| 2-(dodecan-5-yl)-1,3-dioxan-5-yl hydrogen sulfate | 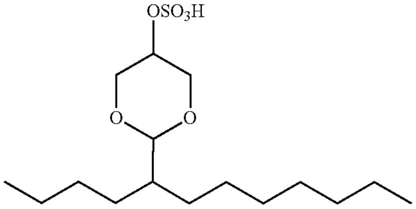 |
| 2-(dodecan-6-yl)-1,3-dioxan-5-yl hydrogen sulfate | 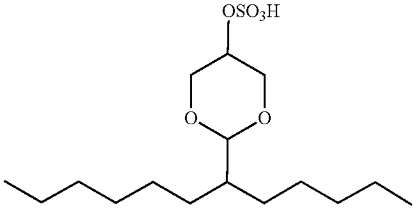 |
| (2-nonyl-1,3-dioxolan-4-yl)methanesulfonic acid | 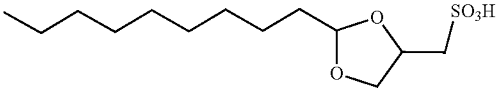 [SMILES: CCCCCCCCCC1OCC(CS(=O)(=O)O)O1] |
| 1,3-Dioxane-5-methanol, 2-undecyl-, 5-(hydrogen sulfate), cis | 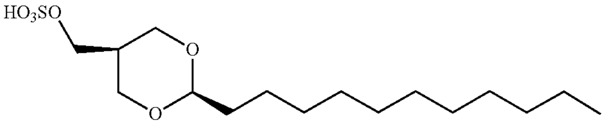 |
| 1,3-Dioxan-5-ol, 2-undecyl-, 5-(hydrogen sulfate), trans | 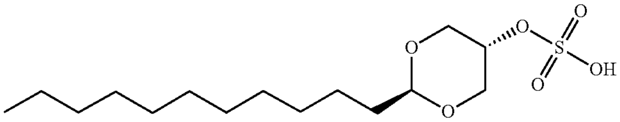 [SMILES: CCCCCCCCCCC[C@H]1OC[C@H](OS(=O)(=O)O)CO1] |
| 1,3-Dioxan-5-ol, 2-undecyl-, 5-(hydrogen sulfate), cis | 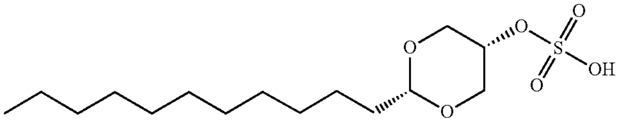 [SMILES: CCCCCCCCCCC[C@H]1OC[C@@H](OS(=O)(=O)O)CO1] |
| 1,3-Dioxan-5-ol, 2-undecyl-, 5-(hydrogen sulfate) | 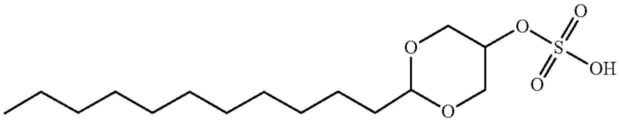 [SMILES: CCCCCCCCCCCC1OCC(OS(=O)(=O)O)CO1] |
| 1,3-Dioxan-5-ol, 2-nonyl-, 5-(hydrogen sulfate), trans | 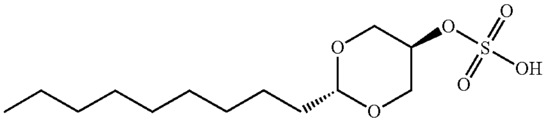 [SMILES: CCCCCCCCC[C@H]1OC[C@H](OS(=O)(=O)O)CO1] |
| 1,3-Dioxan-5-ol, 2-heptyl-, 5-(hydrogen sulfate), cis | 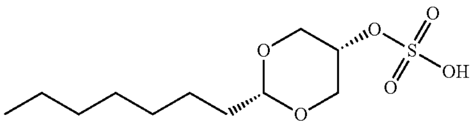 [SMILES: CCCCCCC[C@H]1OC[C@@H](OS(=O)(=O)O)CO1] |

-continued

| Name | Structure |
|---|---|
| 1,3-Dioxan-5-ol, 2-heptyl-, 5-(hydrogen sulfate), trans | 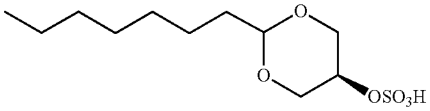 |
| 1,3-Dioxan-5-ol, 2-nonyl-, 5-(hydrogen sulfate), cis | 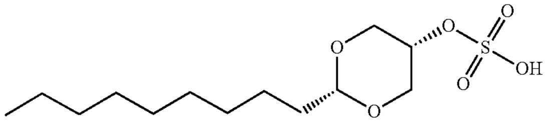 [SMILES: CCCCCCCCC[C@H]1OC[C@@H](OS(=O)(=O)O)CO1] |
| 1,3-Dioxan-5-ol, 2-nonyl-, 5-(hydrogen sulfate) | 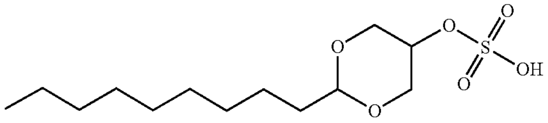 [SMILES: CCCCCCCCCC1OCC(OS(=O)(=O)O)CO1] |
| 1,3-Dioxolan-4-ol, 2-dodecyl-, 4-(hydrogen sulfate) | 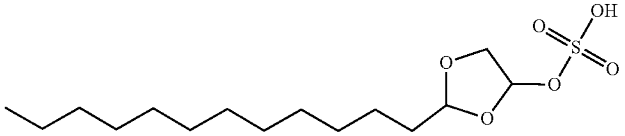 [SMILES: CCCCCCCCCCCCC1OCC(OS(=O)(=O)O)O1] |

The alkyl glyceryl acetal sulfate surfactant can be present in its acid form or salt form, though it is preferred that the glyceryl acetal sulfate surfactant is present in an at least partially neutralised form, with fully neutralised being preferred. Suitable counterions include alkali metal cation earth alkali metal cation, alkanolammonium or ammonium or substituted ammonium. However, sodium is most preferred as the counterion for the glyceryl acetal sulfate surfactant.

The alkyl glyceryl acetal sulfate anionic surfactants of Formula I can comprise one of four isomers, or a blend of two diastereomers. The five-membered ring alkyl glyceryl acetal sulfate anionic surfactant of formula I can have an alkyl chain R1 bound both above and below the plane of the five-membered ring relative to the sulfate group to provide a pair of diastereomers. In addition, this relative special arrangement also occurs in the six-membered alkyl glyceryl acetal sulfate ring of formula II, giving an additional pair of diastereomers; i.e. up to four compounds in total, during ring formation.

Additional Anionic Surfactant

The anionic surfactant can comprise additional anionic surfactant such as those selected from the group consisting of: alkyl sulfonate surfactant, alkyl sulfosuccinate and dialkyl sulfosuccinate ester surfactants, and mixtures thereof. However, in preferred compositions, the anionic surfactant consists of alkyl sulfate anionic surfactant and glyceryl acetal sulfate surfactant.

Anionic alkyl sulfonate or sulfonic acid surfactants suitable for use herein include the acid and salt forms of alkylbenzene sulfonates, alkyl ester sulfonates, primary and secondary alkane sulfonates such as paraffin sulfonates, alfa or internal olefin sulfonates, alkyl sulfonated (poly)carboxylic acids, and mixtures thereof. Suitable anionic sulfonate or sulfonic acid surfactants include: C5-C20 alkylbenzene sulfonates, more preferably C10-C16 alkylbenzene sulfonates, more preferably C11-C13 alkylbenzene sulfonates, C5-C20 alkyl ester sulfonates especially C5-C20 methyl ester sulfonates, C6-C22 primary or secondary alkane sulfonates, C5-C20 sulfonated (poly)carboxylic acids, and any mixtures thereof, but preferably C11-C13 alkylbenzene sulfonates. The aforementioned surfactants can vary widely in their 2-phenyl isomer content. Compared with sulfonation of alpha olefins, the sulfonation of internal olefins can occur at any position since the double bond is randomly positioned, which leads to the position of hydrophilic sulfonate and hydroxyl groups of IOS in the middle of the alkyl chain, resulting in a variety of twin-tailed branching structures. Alkane sulfonates include paraffin sulfonates and other secondary alkane sulfonate (such as Hostapur SAS60 from Clariant).

Alkyl sulfosuccinate and dialkyl sulfosuccinate esters are organic compounds with the formula MO3SCH(CO2R')CH2CO2R where R and R' can be H or alkyl groups, and M is a counterion such as sodium (Na). Alkyl sulfosuccinate and dialkyl sulfosuccinate ester surfactants can be alkoxylated or non-alkoxylated, preferably non-alkoxylated. The surfactant system may comprise further anionic surfactant. However, the composition preferably comprises less than 30%, preferably less than 15%, more preferably less than 10% by weight of the surfactant system of further anionic surfactant. Most preferably, the surfactant system comprises no further anionic surfactant, preferably no other anionic surfactant than alkyl sulfate and the alkyl glyceryl acetal sulfate anionic surfactant.

Co-Surfactant

In order to improve surfactant packing after dilution and hence improve suds mileage, the surfactant system can comprise a co-surfactant. The co-surfactant can be selected from the group consisting of an amphoteric surfactant, a zwitterionic surfactant and mixtures thereof.

The anionic surfactant to the co-surfactant weight ratio can be from 1:1 to 8:1, preferably from 2:1 to 5:1, more preferably from 2.5:1 to 4:1.

The composition preferably comprises from 0.1% to 20%, more preferably from 0.5% to 15% and especially from 2% to 10% by weight of the cleaning composition of the co-surfactant.

The surfactant system of the cleaning composition of the present disclosure preferably comprises up to 50%, preferably from 10% to 40%, more preferably from 15% to 35%, by weight of the surfactant system of a co-surfactant.

The co-surfactant is preferably an amphoteric surfactant, more preferably an amine oxide surfactant.

The amine oxide surfactant can be linear or branched, though linear are preferred. Suitable linear amine oxides are typically water-soluble, and characterized by the formula R1-N(R2)(R3)O. R1 is a C8-18 alkyl, R1 is preferably is a linear alkyl chain, more preferably derived from natural, renewable resources such as coconut or palm kernel, with coconut being particularly preferred. R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are particularly preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the disclosure can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaines, amidazoliniumbetaines, sulfobetaine (INCI Sultaines), phosphobetaines, and mixtures thereof, and preferably meets formula (I):

$$R^1—[CO—X(CH_2)_n]_x—N^+(R^2)(R_3)—(CH_2)_m—[CH(OH)—CH_2]_y—Y^-$$

Wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue; R1 is preferably a linear alkyl chain, preferably derived from natural, renewable resources such as coconut or palm kernel, preferably coconut.

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulfobetaine of formula (Ic) and the amido sulfobetaine of formula (Id):

$$R^1—N^+(CH_3)_2—CH_2COO^- \quad (Ia)$$

$$R^1—CO—NH—(CH_2)_3—N^+(CH_3)_2—CH_2COO^- \quad (Ib)$$

$$R^1—N^+(CH_3)_2—CH_2CH(OH)CH_2SO_3^- \quad (Ic)$$

$$R^1—CO—NH—(CH_2)_3—N^+(CH_3)_2—CH_2CH(OH)CH_2SO_3^- \quad (Id)$$

in which R1 has the same meaning as in formula (I). Particularly preferred are the carbobetaines [i.e. wherein Y—=COO— in formula (I)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine and/or laurylamidopropylbetaine are particularly preferred.

Nonionic Surfactant:

The surfactant system can further comprise a nonionic surfactant. Suitable nonionic surfactants include alkoxylated alcohol nonionic surfactants, alkyl polyglucoside nonionic surfactants, and mixtures thereof. Where the nonionic surfactant comprises a blend of alkyl polyglucoside and alkoxylated alcohol nonionic surfactant, the nonionic surfactant can comprise the alkyl polyglucoside and alkoxylated alcohol nonionic surfactant in a mass ratio of from 10:90 to 90:10, preferably from 30:70 to 70:30, more preferably from 40:60 to 60:40.

The surfactant system of the composition of the present disclosure can further comprise from 1.0% to 50%, preferably from 1.25% to 25%, more preferably from 1.5% to 15%, most preferably from 1.5% to 5%, by weight of the surfactant system, of nonionic surfactant.

Alkoxylated Alcohol Nonionic Surfactant:

Preferably, the alkoxylated alcohol non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. The alkyl chain is preferably linear.

Alkyl Polyglucoside Nonionic Surfactant:

Alkyl polyglucoside nonionic surfactants are typically more sudsing than other nonionic surfactants such as alkyl ethoxylated alcohols.

A combination of alkylpolyglucoside and anionic surfactant especially alkyl sulfate anionic surfactant, has been found to improve polymerized grease removal, suds mileage performance, reduced viscosity variation with changes in the surfactant and/or system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms. The alkyl chain is preferably linear.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

C8-C16 alkyl polyglucosides are commercially available from several suppliers (e.g., Simusol® surfactants from Seppic Corporation; and Glucopon® 600 CSUP, Glucopon® 650 EC, Glucopon© 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulfate anionic surfactant and an alkyl glyceryl acetal sulfate anionic surfactant having an average degree of branching of less than 10% and alkyl polyglucoside nonionic surfactant.

Polyhydroxy Fatty Acid Amide Nonionic Surfactant:

Polyhydroxy-fatty acid amides are nonionic surfactants which can be employed for many uses. Polyhydroxy-fatty acid amide nonionic surfactants are typically stronger for food grease removal than other nonionic surfactants such as alkyl ethoxylated alcohols and can provide improved sudsing profiles.

These materials have been previously described in U.S. Pat. No. 5,334,764 (Procter & Gamble) and by U.S. Pat. No. 5,571,934 (Clariant). These surfactants are currently sold under the tradename Glucotain™ by Clariant. Polyhydroxy-fatty acid amides are readily biologically degradable and can be prepared from renewable raw materials. The polyhydroxy-fatty acid amides in question are as a rule compounds of the formula R—CO—NR'—Z, in which R is a saturated or unsaturated hydrocarbon radical having about 5 to 30 carbon atoms, preferably 8 to 18 carbon atoms, R' is H, alkyl or hydroxyalkyl having up to preferably 8 carbon atoms and Z is a polyhydroxy hydrocarbon radical having at least three OH, preferably a sugar alcohol radical. Z can be alkoxylated.

In preferred compositions, the surfactant system can comprise an alkyl sulfate anionic surfactant and an alkyl glyceryl acetal sulfate anionic surfactant having an average degree of branching of less than 10% and polyhydroxy fatty acid amide nonionic surfactant.

Further Ingredients:

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Preferred further ingredients include those selected from: amphiphilic alkoxylated polyalkyleneimines, cyclic polyamines, triblock copolymers, hydroxypropylcellulose polymers, salt, hydrotropes, organic solvents, and mixtures thereof.

Amphiphilic Alkoxylated Polyalkyleneimine:

The composition of the present disclosure may further comprise from 0.05% to 2%, preferably from 0.07% to 1% by weight of the total composition of an amphiphilic polymer.

Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

The amphiphilic alkoxylated polyethyleneimine polymers can be made by the methods described in more detail in PCT Publication No. WO 2007/135645.

Alternatively, the compositions can be free of amphiphilic polymers.

Cyclic Polyamine

The composition can comprise a cyclic polyamine having amine functionalities that helps cleaning. The composition of the disclosure preferably comprises from 0.1% to 3%, more preferably from 0.2% to 2%, and especially from 0.5% to 1%, by weight of the total composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

(I)

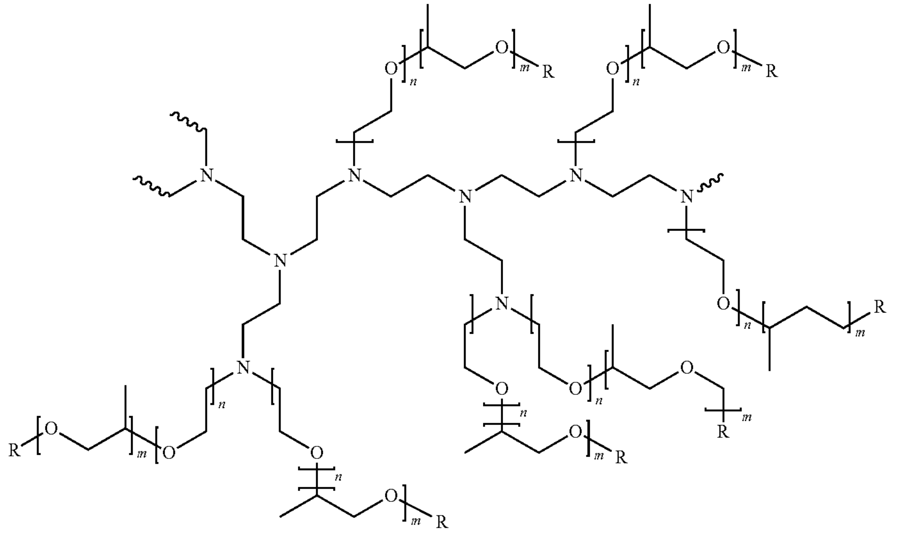

wherein the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

Accordingly, the most preferred cyclic polyamine for use with the cleaning composition of the present disclosure are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present disclosure.

Suitable cyclic polyamines can be supplied by BASF, under the Baxxodur tradename, with Baxxodur ECX-210 being particularly preferred.

A combination of the cyclic polyamine and magnesium sulfate is particularly preferred. As such, the composition can further comprise magnesium sulfate at a level of from 0.001% to 2.0%, preferably from 0.005% to 1.0%, more preferably from 0.01% to 0.5% by weight of the composition.

Triblock Copolymer

The composition of the disclosure can comprise a triblock copolymer. The triblock co-polymers can be present at a level of from 1% to 20%, preferably from 3% to 15%, more preferably from 5% to 12%, by weight of the total composition. Suitable triblock copolymers include alkylene oxide triblock co-polymers, defined as a triblock co-polymer having alkylene oxide moieties according to Formula (I): (EO)x(PO)y(EO)x, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 EO blocks of from 3:1 to 2:1. Preferably the triblock co-polymer has an average weight percentage of total E-O of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the liquid hand dishwashing detergent composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic© PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

Hydroxypropylcellulose Polymer:

The liquid hand dishwashing detergent can comprise a hydroxypropylcellulose polymer (HPC). Hydroxypropyl cellulose is a derivative of cellulose with both water solubility and organic solubility. Such hydroxypropylcellulose polymers can be used to improve sudsing of hand dishwashing detergent compositions.

The hydroxypropylcellulose polymer of use in the compositions of the present disclosure has a number average molecular weight of from 5 kDa to 250 kDa. The hydroxypropylcellulose polymer can have a number average molecular weight of from 10 kDa to 100 kDa, preferably 30 kDa to 50 kDa.

The composition can comprise from 0.01% to 3.0%, preferably from 0.05% to 2.0%, more preferably from 0.1% to 1.0% by weight of the composition of the hydroxypropylcellulose polymer.

Salt:

The composition of the present disclosure may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulfate, and mixtures thereof. Sodium chloride is most preferred.

Hydrotrope:

The composition of the present disclosure may comprise from about 0.1% to about 10%, or preferably from about 0.5% to about 10%, or more preferably from about 1% to about 10% by weight of the total composition of a hydrotrope or a mixture thereof, preferably sodium cumene sulfonate.

Organic Solvent:

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol, with polypropyleneglycols having a weight average molecular weight of from 750 Da to 1,400 Da being particularly preferred.

Packaged Product

The hand dishwashing detergent composition can be packaged in a container, typically plastic containers. Suitable containers comprise an orifice. Typically, the container comprises a cap, with the orifice typically comprised on the cap. The cap can comprise a spout, with the orifice at the exit of the spout. The spout can have a length of from 0.5 mm to 10 mm.

The orifice can have an open cross-sectional surface area at the exit of from 3 $mm^2$ to 20 $mm^2$, preferably from 3.8 $mm^2$ to 12 $mm^2$, more preferably from 5 $mm^2$ to 10 $mm^2$, wherein the container further comprises the composition according to this disclosure. The cross-sectional surface area is measured perpendicular to the liquid exit from the container (that is, perpendicular to the liquid flow during dispensing).

The container can typically comprise from 200 ml to 5,000 ml, preferably from 350 ml to 2000 ml, more preferably from 400 ml to 1,000 ml of the liquid hand dishwashing detergent composition.

Method of Washing

The present disclosure is further directed to a method of manually washing dishware with the composition of the present disclosure. The method comprises the steps of delivering a composition of the present disclosure to a volume of water to form a wash solution and immersing the dishware in the solution. The dishware is be cleaned with the composition in the presence of water.

Optionally, the dishware can be rinsed. By "rinsing", it is meant herein contacting the dishware cleaned with the process according to the present disclosure with substantial quantities of appropriate solvent, typically water. By "substantial quantities", it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present disclosure diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the present disclosure is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Alternatively, the composition herein can be applied in its neat form to the dish to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Another aspect of the present disclosure is directed to use of the liquid hand dishwashing cleaning compositions, described herein, for providing good sudsing profile, including suds stabilization in the presence of greasy soils, and good cleaning while providing good low temperature stability, at an increased bioderived surfactant content and biodegradability profile.

Methods:

A) Viscosity Measurement

The viscosity is measured at 20° C. with a Brookfield RT Viscometer using spindle 31 with the RPM of the viscometer adjusted to achieve a torque of between 40% and 60%.

B) Suds Generation and Suds Mileage Test Method

This method is used to assess the ability of the test composition to generate suds as well as the robustness of the suds generated, in the presence of soil.

The suds generation and suds mileage of test cleaning compositions is measured by employing a suds cylinder tester (SCT). The SCT has a set of 8 cylinders. Each cylinder is a Lexan plastic cylinder typically 30 cm long and 8.8 cm internal diameter, with an adhesive ruler affixed to the outside, and a small diameter hole in the top to enable soil additions. All 8 cylinders are oriented vertically and fixed at their centre point to a horizontal bar.

Approximately 500 ml of the test cleaning solutions are prepared at a surfactant concentration of 359 mg/L in water heated to 60° C. and a water hardness of 257 mg/L made using calcium chloride and magnesium chloride at a 3:1 molar ratio of calcium:magnesium. 300 ml of each test sample solution is poured into a test cylinder of the SCT. When the test solutions have cooled to 45° C., rubber stoppers are put in place to seal the hole in the top of each cylinder.

Rotate the horizontal bar and cylinders together at a rate of 20-22 revolutions per minute (rpm) for 2 minutes before locking them in the upright position. Record the initial suds height for each cylinder. The height of suds is determined by deducting the height of the liquid layer from the total height of suds and liquid. Continue rotating the cylinders at the same RPM, recording suds height after every 2 minutes of rotation for a total of 20 minutes. This data represents the Suds Generation of the test cleaning composition. Open the rubber stopper on each cylinder. Add 10.00 g of the test soil described below into each cylinder. Replace the rubber stoppers. Record the starting suds height, and rotate the cylinders for 1 minute as described above. Lock in an upright position. Record the suds height. Continue rotating the cylinders, recording suds height after every 1 minute of rotation for a total of 15 minutes of rotation. This data represents the Suds Mileage of the test cleaning composition.

The data is recorded as suds generation or suds mileage (cm) vs time (min). The Area under the curve (AUC) is calculated using suds generation or suds mileage vs time data and using the trapezoidal rule calculation:

$$\int_a^b f(x)\,dx \approx \sum_{k=1}^{N} \frac{f(x_{k-1}) + f(x_k)}{2} \Delta x_k$$

The AUC results for Suds Generation or Suds Mileage for each test solution are divided by the corresponding AUC result for the relevant reference composition and reported as an index (%) compared to the control (100%).

The test soil is prepared by mixing of the components described below until a homogenous mixture is achieved:

TABLE 1

Test soil composition

| Ingredient | Weight % |
|---|---|
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

C) Dynamic Interfacial Tension (DIFT) Test Method

The Dynamic Interfacial Tension is measured using a Krüss® DVT30 Drop Volume Tensiometer (Kruss USA, Charlotte, NC). The instrument is configured to measure the interfacial tension of an ascending oil drop in aqueous surfactant phase. The test surfactant solutions are prepared at a surfactant concentration of 359 mg/L in water and a water hardness of 120 mg/L made using calcium chloride and magnesium chloride at a 3:1 molar ratio of calcium:magnesium. The oil used is canola oil (Crisco Pure Canola Oil manufactured by The J.M. Smucker Company). The aqueous surfactant and oil phases are temperature controlled at 22° C. (+/−1° C.), via a recirculating water temperature controller attached to the tensiometer. A dynamic interfacial tension curve is generated by dispensing the oil drops into the aqueous surfactant phase from an ascending capillary with an internal diameter of 0.2540 mm, over a range of flow rates and measuring the interfacial tension at each flow rate. Data is generated at oil dispensing flow rates of from 500 uL/min to 1 uL/min with 2 flow rates per decade on a logarithmic scale. Interfacial tension is measured on three oil drops per flow rate and then averaged. Interfacial tension is reported in units of mN/m. Surface age of the oil drops at each flow rate is also recorded and plots may be generated either of interfacial tension (y-axis) versus oil flow rate (x-axis) or interfacial tension (y-axis) versus oil drop surface age (x-axis).

The minimum interfacial tension (mN/m) is the lowest interfacial tension at the slowest flow rate, with lower numbers indicating improved performance. Based on instrument reproducibility, differences greater than 0.1 mN/m are significant for interfacial tension values of less than 1 mM/m.

D) Minimum Surface Tension and Critical Micelle Concentration

The surface tension is measured using a Kibron Delta-8 DyneProbe. Before every run, the DyneProbes are heated using the Kibron DyneClean furnace. The bottom end of each probe is brought into contact onto a very hot surface, such that, upon contact, the tip of the probe is heated to around 600° C. This ensures consistent and repeatably clean surfaces.

The critical micelle concentration (CMC) of the surfactant is calculated by plotting the surface tension of respective surfactant solutions as a function of the logarithm of surfactant concentration at the desired water temperature (20.5 C) and hardness of 120 mg/L made using calcium chloride and magnesium chloride at a 3:1 molar ratio of calcium:magnesium. The point where the surface tension versus surfactant concentration slope changes from a high degree of change to one that is nearly horizontal is defined as the CMC value.

A typical CMC determination comprises the following steps:

1. Dispensing aliquots of solution: Liquid handling is done using a pipetting robot.
2. Probe cleaning: The DyneProbes are heated to red hot to burn off all contaminants.
3. Immersion and withdrawal: The DyneProbes are positioned above a row of 8 wells and immersed gently. The force on the plate is measured continuously (400 times/s) and upon withdrawal the surface tension is determined.
4. Analysis: Up to 96 data points are acquired in around 3 minutes. These are automatically logged to a PC and the CMC is determined as exemplified in FIG. 1, and generated using the C12 glyceryl acetal sulfate combination below (Table 2).

TABLE 2

| Sample Name | Activity (cat. SO3) | Structure 2/1 mixture | Ave. CMC N = 3 (PPM) | Min ST mN/m |
|---|---|---|---|---|
| C12 Glyceryl Acetal Sulfates | 90.9% | 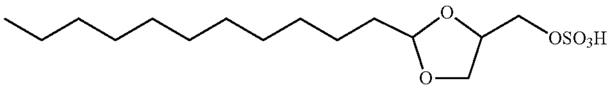 + 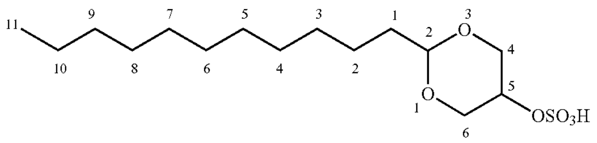 | 323 | 34.7 |

EXAMPLES

Example 1: Preparation of Dodecanal Glyceryl Acetal Sulfate, Sodium Salt

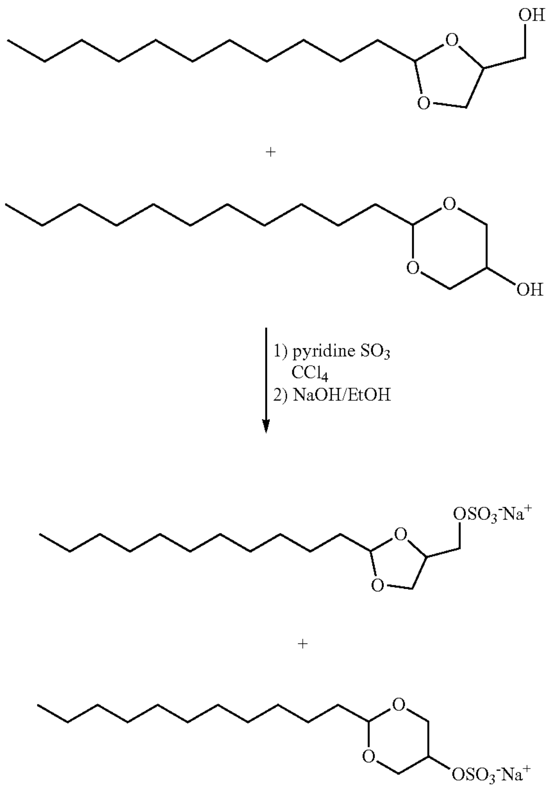

Unless specified otherwise, all materials can be obtained from Sigma Aldrich.

To a 500-ml, single neck, round bottom reaction flask equipped with a magnetic stir bar was added 62.622 grams (0.2423 moles) of dodecanal glyceryl acetal (which is a mixture of isomers of cis- and trans-2-undecyl-1,3-dioxan-5-ol, and cis- and trans-(2-undecyl-1,3-dioxolan-4-yl) methanol, 150 ml of tetrachloromethane and 1 ml of pyridine. With mixing at room temperature, 98% sulfur trioxide pyridine complex was added in portions of 10.674 grams, 10.666 grams, 10.948 grams and 9.097 grams for a total of 41.385 grams (equal to 40.56 grams, or 0.2548 moles, of sulfur trioxide pyridine complex on 100% basis). Attached to the reaction flask was a water-cooled condenser equipped with a nitrogen line at the top leading to a gas bubbler. With mixing under a nitrogen atmosphere, the reaction flask was heated for 15 hours at 47° C. using an oil bath. The reaction mixture was concentrated by evaporating off tetrachloromethane under vacuum using a rotary evaporator, yielding an off-white solid product, which was then dissolved in a solution prepared from 23.487 g of 50% sodium hydroxide, 250 ml of deionized water and 250 ml of absolute ethanol (>99% by weight of ethanol) to form a clear orange solution. The solution pH was measured to be 7.0-8.0 using pH test strip paper. To the solution, with mixing, was added enough 6.75 wt % sodium hydroxide solution to bring the solution to pH between 10.0 and 11.0. The solution was transferred to a 2 L separatory funnel and extracted twice with hexane solvent. The water/ethanol layer was isolated and concentrated under vacuum using a rotary evaporator (while heating with a 40° C. water bath) until the product began to foam excessively. Concentrating was stopped, absolute ethanol was added to the product and concentrating was resumed until product again began to foam excessively. This process of absolute ethanol addition followed by additional concentration was repeated until a very viscous solution was obtained as observed with the human eye. The solution was then transferred to a large crystallizing dish, the dish was partially covered with a watch glass, and a nitrogen stream was blown over the surface of the solution overnight. The next day, the product crystallized and was placed in a vacuum oven under full vacuum (0.75 mm Hg, 100 Pa) at room temperature. After 3 days in the vacuum oven, the product was a crisp solid, which was ground into a powder using a mortar and pestle and placed back into the vacuum oven under full vacuum (0.75 mm Hg, 100 Pa) at room temperature. After 2 additional days in the vacuum oven, the product was removed and transferred to a bottle for storage. 70.85 grams of a tan-coloured powered product was recovered.

The final active level of the dodecanal glyceryl acetal sulfate, sodium salt product was determined to be 77.22% by Cationic S03 colorimetric two-phase (water/chloroform) mixed indicator (dimidium bromide/patent blue VF) titration method using Hyamine 1622 as the cationic titrant as described in Method ASTM D3049-89-Standard Test Method for Synthetic Anionic Ingredient by Cationic Titration and as described by Reid V. W., G. F. Longman, E. Heinerth, "Determination of anionic active detergents by two-phase titration", *Tenside* 4, 292-304 (1967).

Suds Generation, Suds Mileage, and Minimum Interfacial Tension Measurements for Compositions Comprising the Glyceryl Acetal Sulfate Anionic Surfactant:

Test Solutions were prepared at 359 mg/L (ppm) total surfactant at a weight ratio of anionic surfactant to C12,14 dimethyl amine oxide of 3.7:1. The anionic surfactant was varied at ratios of 100:0, 75:25, 50:50, 25:75, and 0:100 of C12,14 alkyl sulfate, sodium salt:dodecanal glyceryl acetal sulfate, sodium salt (from example 1). C12,14 alkyl sulfate, sodium salt is commonly used as an anionic surfactant within liquid hand dishwashing detergent formulations, and the like.

Suds generation, suds mileage, and minimum interfacial tension for the test solutions were measured according to the methods described above. The data tabulated below clearly shows the improved suds mileage performance in the presence of soil of mixed alkyl sulfate-alkyl glyceryl acetal sulfate anionic surfactant systems compared to the individual anionic surfactant systems and improved grease handling potential as demonstrated by the lower oil/water interfacial tensions.

Materials Used:

- Sodium dodecyl glyceryl acetal sulfate (C12-GAS) of Example 1
- C12-14 dimethyl amine oxide (C12,14 DMAO)
- C12 14 alkyl sulfate, sodium salt (C12,14 AS)

TABLE 3: Suds generation, suds mileage, and minimum interfacial tension values for a comparative surfactant mixture (Mixture A) and the surfactant mixtures in accordance with the present disclosure (Mixtures 1 to 4).

TABLE 3

| | C12, 14 AS mg/L | C12 GAS mg/L | C12, 14 DMAO mg/L | Total Surfactant mg/L | Suds Mileage Index | Min. IFT, mN/m |
|---|---|---|---|---|---|---|
| Mixture A | 282.6 | 0 | 76.4 | 359 | 100 | 0.44 |
| Mixture 1 | 212 | 70.6 | 76.4 | 359 | 119 | 0.18 |
| Mixture 2 | 141.3 | 141.3 | 76.4 | 359 | 106 | 0.24 |
| Mixture 3 | 70.6 | 212 | 76.4 | 359 | 104 | 0.34 |
| Mixture 4 | 0 | 282.6 | 76.4 | 359 | 83 | 0.59 |

The following compositions are exemplary detergent compositions according to the present disclosure. These compositions can be prepared through mixing of the individual components in a batch type or continuous liquid type process.

| | Ex. 1 wt % | Ex. 2 wt % | Ex. 3 wt % | Ex. 4 wt % |
|---|---|---|---|---|
| C12-13 $AE_{0.6}S$ anionic surfactant (avg branching: 38%), sodium salt | 13.7 | — | — | — |
| C12-13 AS anionic surfactant (avg branching: 24%), sodium salt | — | 15 | — | 17 |
| C12-14 AS anionic surfactant (avg branching: 0%), sodium salt | — | — | 13 | — |
| Sodium dodecyl glyceryl acetal sulfate (C12-GAS) of Example 1 | 5.9 | 5 | 7 | 3 |
| C12-14 dimethyl amine oxide | 6.5 | — | 6.5 | — |
| Cocoamidopropylbetaine | — | 6.5 | — | 6.5 |
| Neodol 91-EO8 nonionic surfactant | 1 | — | — | 1 |
| C10-16 APG (Glucopon 600) | — | 1.5 | 1 | 1 |
| C8-C10 APG (Gucopon 215) | — | — | 2 | — |
| Polypropylene glycol (mw 2000) | 0.85 | 0.75 | 0.9 | 1.0 |
| Ethanol | 2.4 | 2.8 | 2 | 1.5 |
| NaCl | 0.7 | 0.6 | 1.0 | 1.2 |
| Alkoxylated polyethyleneimine (PEI600EO24PO16)[1] | 0.2 | 0.1 | — | 0.35 |
| Baxxodur ECX210 | — | 0.1 | — | — |
| NaOH | Till pH 9.0 | Till pH 8.5 | Till pH 9.2 | Till pH 8.7 |
| Water and minors (perfume, dye, preservative) | Balance | | | |

[1]amphiphilic alkoxylated polyethyleneimine (total MW: about 28000) with a polyethyleneimine backbone of MW 600 and alkoxylation chains each chain comprising 24 internal EO units and 16 terminal PO units, available from BASF.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure described or claimed herein or that it alone, or in any combination with any other reference or references, teaches, suggests or discloses the presently described compositions and methods. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A liquid hand dishwashing detergent composition comprising:

from about 5.0% to about 50% of a surfactant system by weight of the liquid hand dishwashing detergent composition, wherein:

the surfactant system comprises an anionic surfactant;

the anionic surfactant comprises an alkyl sulfate anionic surfactant and glyceryl acetal sulfate surfactant; and the glyceryl acetal sulfate surfactant is selected from glyceryl acetal sulfate having the formula I or formula II or salts thereof, and mixtures thereof:

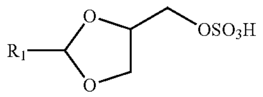

(I)

wherein R1 is an alkyl chain comprising from 7 to 18 carbon atoms; and

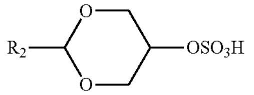

(II)

wherein R2 is an alkyl chain comprising from 7 to 18 carbon atoms.

2. The composition according to claim 1, wherein the composition comprises from about 6.0% to about 40% by weight of the total composition of the surfactant system.

3. The composition according to claim 1, wherein the surfactant system comprises at least about 40% by weight of the surfactant system of the anionic surfactant.

4. The composition according to claim 3, wherein the surfactant system comprises from about 60% to about 90% by weight of the surfactant system of the anionic surfactant.

5. The composition according to claim 1, wherein the alkyl glyceryl acetal sulfate surfactant is selected from the group consisting of: 2-dodecyl-1,3-dioxan-5-yl hydrogen sulfate; (2-dodecyl-1,3-dioxolan-4-yl)methyl hydrogen sulfate; 2-(dodecan-2-yl)-1,3-dioxan-5-yl hydrogen sulfate; (2-(dodecan-2-yl)-1,3-dioxolan-4-yl)methyl hydrogen sulfate; (2-decyl-1,3-dioxolan-4-yl)methyl hydrogen sulfate; (2-(heptan-3-yl)-1,3-dioxolan-4-yl)methyl hydrogen sulfate; (2-(nonan-4-yl)-1,3-dioxolan-4-yl)methyl hydrogen sulfate; (2-dodecan-3-yl)-1,3-dioxolan-4-yl)methyl hydrogen sulfate; (2-(dodecan-4-yl)-1,3-dioxolan-4-yl)methyl hydrogen sulfate; (2-(dodecan-5-yl)-1,3-dioxolan-4-yl)methyl hydrogen sulfate; (2-(dodecan-6-yl)-1,3-dioxolan-4-yl)methyl hydrogen sulfate; 2-decyl-1,3-dioxan-5-yl hydrogen sulfate; 2-(heptan-3-yl)-1,3-dioxan-5-yl hydrogen sulfate; 2-(nonan-4-yl)-1,3-dioxan-5-yl hydrogen sulfate; 2-(dodecan-3-yl)-1,3-dioxan-5-yl hydrogen sulfate; 2-(dodecan-4-yl)-1,3-dioxan-5-yl hydrogen sulfate; 2-(dodecan-5-yl)-1,3-dioxan-5-yl hydrogen sulfate; 2-(dodecan-6-yl)-1,3-dioxan-5-yl hydrogen sulfate; (2-nonyl-1,3-dioxolan-4-yl)methanesulfonic acid; 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate); 1,3-Dioxan-5-ol, 2-nonyl-, 5-(hydrogen sulfate), trans; 1,3-Dioxan-5-ol, 2-heptyl-, 5-(hydrogen sulfate), cis; 1,3-Dioxan-5-ol, 2-heptyl-, 5-(hydrogen sulfate), trans; 1,3-Dioxan-5-ol, 2-nonyl-, 5-(hydrogen sulfate), cis; 1,3-Dioxan-5-ol, 2-nonyl-, 5-(hydrogen sulfate); 1,3-Dioxolan-4-ol, 2-dodecyl-, 4-(hydrogen sulfate), and mixtures thereof.

6. The composition according to claim 5, wherein the alkyl glyceryl acetal sulfate surfactant is selected from the group consisting of: 2-dodecyl-1,3-dioxan-5-yl hydrogen sulfate; (2-dodecyl-1,3-dioxolan-4-yl)methyl hydrogen sulfate; 2-(dodecan-2-yl)-1,3-dioxan-5-yl hydrogen sulfate; (2-(dodecan-2-yl)-1,3-dioxolan-4-yl)methyl hydrogen sulfate; (2-decyl-1,3-dioxolan-4-yl)methyl hydrogen sulfate; 2-decyl-1,3-dioxan-5-yl hydrogen sulfate; 1,3-Dioxolan-4-ol, 2-dodecyl-, 4-(hydrogen sulfate); 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate), and mixtures thereof.

7. The composition according to claim 6, wherein the alkyl glyceryl acetal sulfate surfactant is selected from the group consisting of: 2-dodecyl-1,3-dioxan-5-yl hydrogen sulfate; (2-dodecyl-1,3-dioxolan-4-yl)methyl hydrogen sulfate; 2-(dodecan-2-yl)-1,3-dioxan-5-yl hydrogen sulfate; (2-(dodecan-2-yl)-1,3-dioxolan-4-yl)methyl hydrogen sulfate; 1,3-Dioxane-5-methanol, 2-undecyl-, 5-(hydrogen sulfate), cis; 1,3-Dioxan-5-ol, 2-undecyl-, 5-(hydrogen sulfate), trans; 1,3-Dioxan-5-ol, 2-undecyl-, 5-(hydrogen sulfate), cis; 1,3-Dioxan-5-ol, 2-undecyl-, 5-(hydrogen sulfate), and mixtures thereof.

8. The composition according to claim 1, wherein the alkyl sulfate anionic surfactant has a degree of alkoxylation of less than about 0.25.

9. The composition according to claim 8, wherein the alkyl sulfate anionic surfactant is free of alkoxylation.

10. The composition according to claim 1, wherein the anionic surfactant comprises at least about 70% by weight of the anionic surfactant of alkyl sulfate anionic surfactant and alkyl glyceryl acetal sulfate surfactant.

11. The composition according to claim 1, wherein the alkyl sulfate anionic surfactant has a number average alkyl chain length of from about 8 to about 18 carbon atoms.

12. The composition according to claim 1, wherein the alkyl sulfate anionic surfactant has an average degree of branching of less than about 15%.

13. The composition according to claim 11, wherein the alkyl sulfate anionic surfactant is linear.

14. The composition according to claim 1, wherein the anionic surfactant comprises at least about 25% by weight of the anionic surfactant of alkyl sulfated anionic surfactant.

15. The composition according to claim 1, wherein the alkyl sulfate anionic surfactant and the alkyl glyceryl acetal sulfate surfactant are present at a weight ratio of from about 10:1 to about 1:2.

16. The composition according to claim 1, wherein the surfactant system further comprises a nonionic surfactant selected from the group consisting of alkoxylated alcohol nonionic surfactants, alkyl polyglucoside nonionic surfactants, polyhydroxy fatty acid amide nonionic surfactants, and mixtures thereof.

17. The composition according to claim 1, wherein the surfactant system further comprises a co-surfactant selected from the group consisting of amphoteric co-surfactant, zwitterionic co-surfactant, and mixtures thereof.

18. The composition according to claim 17, wherein the anionic surfactant and the co-surfactant are present in a weight ratio of from about 1:1 to about 8:1.

19. The composition according to claim 17, wherein the co-surfactant comprises an amine oxide surfactant selected from the group consisting of alkyl dimethyl amine oxide, alkyl amido propyl dimethyl amine oxide, alkyl diethanol amine oxide, and mixtures thereof.

20. The composition according to claim 17, wherein the co-surfactant comprises a betaine surfactant selected from the group consisting of alkyl betaines, alkylamidoalkylbetaines, a amidazoliniumbetaines, sulfobetaines, phosphobetaines, cocoamidopropylbetaines, laurylamidopropylbetaines, and mixtures thereof.

* * * * *